United States Patent
Yang et al.

(10) Patent No.: US 11,487,773 B2
(45) Date of Patent: Nov. 1, 2022

(54) QUERY METHOD, APPARATUS, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Shuangquan Yang, Beijing (CN); Yang Zhang, Beijing (CN); Yi Xie, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/207,460

(22) Filed: Mar. 19, 2021

(65) Prior Publication Data
US 2021/0224273 A1    Jul. 22, 2021

(30) Foreign Application Priority Data
Jun. 30, 2020   (CN) ........................ 202010607625.X

(51) Int. Cl.
G06F 16/2458   (2019.01)
G06F 16/242    (2019.01)
G06F 16/2457   (2019.01)

(52) U.S. Cl.
CPC ...... *G06F 16/2477* (2019.01); *G06F 16/2433* (2019.01); *G06F 16/2465* (2019.01); *G06F 16/24578* (2019.01)

(58) Field of Classification Search
None
See application file for complete search history.

(56) References Cited

U.S. PATENT DOCUMENTS 9,116,982 B1 *   8/2015   Stern ..................... G06F 16/288
9,268,824 B1 *   2/2016   Federici ............... G06F 16/335
(Continued)

OTHER PUBLICATIONS

"SQL—CLC Definition." The Computer Language Company. Retrieved on Mar. 29, 2022 from https://www.computerlanguage.com/results.php?definition=SQL (Year: 2022).*
(Continued)

*Primary Examiner* — Tony Mahmoudi
*Assistant Examiner* — Umar Mian
(74) *Attorney, Agent, or Firm* — J.C. Patents

(57) ABSTRACT

The present disclosure discloses a query method, an apparatus, an electronic device, and a storage medium, and relates to the technical field of spatio-temporal big data in big data technologies. The specific implementation scheme is as follows: receiving a query request sent by a terminal device, where the query request is used to request to query dynamic association relationships of a target entity and includes an identifier of the target entity and query starting and ending time; determining at least one time bucket to be queried in a query database according to the query starting and ending time, where each time bucket stores the dynamic association relationships of the target entity in a time period corresponding to the time bucket; and querying the dynamic association relationships of the target entity in the at least one time bucket according to the identifier of the target entity.

20 Claims, 4 Drawing Sheets

(56) References Cited

U.S. PATENT DOCUMENTS

| | | | |
|---|---|---|---|
| 2007/0282560 A1* | 12/2007 | Anderson | G01W 1/00 |
| | | | 707/999.1 |
| 2014/0258281 A1 | 9/2014 | Chen | |
| 2014/0337373 A1* | 11/2014 | Morsi | G06F 16/245 |
| | | | 707/769 |
| 2015/0256635 A1 | 9/2015 | Casey | |
| 2016/0070736 A1* | 3/2016 | Swan | G06F 16/2322 |
| | | | 707/746 |
| 2017/0052960 A1* | 2/2017 | Alizadeh-Shabdiz | ....... |
| | | | G06F 16/285 |
| 2018/0024901 A1* | 1/2018 | Tankersley | G06T 11/206 |
| | | | 707/694 |
| 2021/0286815 A1* | 9/2021 | Aylett | G06F 16/24535 |
| 2021/0352609 A1* | 11/2021 | Kiefer | G06N 20/00 |

OTHER PUBLICATIONS

The EESR of EP21163936.4.
First Office Action of the parallel JP application.
NPL: "A hadoop-based storage system for big spatio-temporal data analytics", CIKM '12: Proceedings of the 21st ACM international conference on Information and knowledge management [online], ACM, Oct. 29, 2012, pp. 2139-2143.

* cited by examiner

QUERY METHOD, APPARATUS, ELECTRONIC DEVICE AND STORAGE MEDIUM

CROSS-REFERENCE TO RELATED APPLICATIONS

This application claims priority to Chinese Patent Application No. 202010607625.X, filed on Jun. 30, 2020, which is hereby incorporated by reference in its entirety.

TECHNICAL FIELD

The present disclosure relates to the field of artificial intelligence, and in particular to the technical field of spatio-temporal big data in big data technologies. Specifically, the present disclosure provides a query method, an apparatus, an electronic device, and a storage medium.

BACKGROUND

In a general environment where the Internet is popularized, various monitoring, checkpoints and other collection devices generate a large amount of user behavior data every day. The behavior data may include behaviors of staying in hotels, traffic traveling, phone calls, express delivery, criminal custody, etc. Based on these behavior data, dynamic association relationships between various entities are analyzable to find hidden relationships between different people, vehicles, or devices. This is of great significance for security scenarios such as case research and judgment, stability maintenance, terrorism, violence, etc.

In related technologies, a method of map reduce is mainly adopted for a query of dynamic association relationships between various entities. Specifically, the query and ranking calculations is performable by using an object relation mapping framework language (hibernate query language, HQL) from the hive database or writing a distributed query program.

However, the use of the method of map reduce to query dynamic association relationships usually results in a problem of low query speed.

SUMMARY

The present disclosure provides a query method, an apparatus, an electronic device, and a storage medium.

According to a first aspect of the present disclosure, a query method is provided, including:

receiving a query request sent by a terminal device, where the query request is used to request to query dynamic association relationships of a target entity and includes an identifier of the target entity and query starting and ending time;

determining at least one time bucket to be queried in a query database according to the query starting and ending time, where each time bucket stores the dynamic association relationships of the target entity in a time period corresponding to the time bucket; and querying the dynamic association relationships of the target entity in the at least one time bucket according to the identifier of the target entity.

According to a second aspect of the present disclosure, a query apparatus is provided, including:

a receiving module, configured to receive a query request sent by a terminal device, where the query request is used to request to query dynamic association relationships of a target entity and includes an identifier of the target entity and query starting and ending time;

a processing module, configured to determine at least one time bucket to be queried in a query database according to the query starting and ending time, where each time bucket stores the dynamic association relationships of the target entity in a time period corresponding to the time bucket; and a querying module, configured to query the dynamic association relationships of the target entity in the at least one time bucket.

According to a third aspect of the present disclosure, an electronic device is provided, including:

at least one processor; and a memory communicatively connected with the at least one processor;

where the memory stores instructions executable by the at least one processor, and the instructions are executed by the at least one processor to enable the at least one processor to execute the method according to the first aspect.

According to a fourth aspect of the present disclosure, a non-transitory computer-readable storage medium is provided, storing computer instructions for causing a computer to execute the method according to the first aspect.

According to a fifth aspect of the present disclosure, a query method is provided, including:

determining at least one time bucket to be queried in a query database according to query starting and ending time in a query request, where each time bucket stores dynamic association relationships of an entity in a time period corresponding to the time bucket; and querying dynamic association relationships of a target entity in the query request in the at least one time bucket.

Technologies according to the present disclosure solves the problem of low speed for querying the dynamic association relationships in the prior art. Compared with the prior art, the present disclosure uses a time bucketing method to query dynamic associated information of the target entity, which allows for effectively reducing the calculation burden and improving the speed for querying the dynamic association information.

It should be understood that the content described in this section is not intended to identify key or important features of embodiments of the present disclosure, or to limit the scope of the present disclosure. Other features of the present disclosure will be easily understood through the following description.

BRIEF DESCRIPTION OF THE DRAWINGS

The drawings are used for a better understanding of the solution and do not constitute a limitation to the present disclosure, where.

DETAILED DESCRIPTION OF THE EMBODIMENTS

The following describes exemplary embodiments of the present disclosure with reference to the accompanying drawings, which includes various details of the embodiments of the present disclosure to facilitate understanding, and should be regarded as merely exemplary. Therefore, those of ordinary skill in the art should realize that various changes and modifications can be made to the embodiments described herein without departing from the scope and spirit of the present disclosure. Likewise, for clarity and conciseness, descriptions of well-known functions and structures are omitted in the following description.

In a general environment where the Internet is popularized, various monitoring, checkpoints and other collection devices generate a large amount of user behavior data every day. The behavior data may include behaviors of staying in hotels, traffic traveling, phone calls, express delivery, criminal custody, etc. Based on these behavior data, dynamic association relationships between various entities are analyzable to find hidden relationships between different people, vehicles, or devices. This is of great significance for security scenarios such as case research and judgment, stability maintenance, terrorism, violence, etc.

In related technologies, a method of map reduce is mainly adopted for a query of dynamic association relationships between various entities. Specifically, the query and ranking calculations is performable by using an object relation mapping framework query language (hibernate query language, HQL) from the hive database or writing a distributed query program.

However, the use of the method of map reduce to query dynamic association relationships usually results in a problem of low query speed.

The present disclosure provides a query method, an apparatus, an electronic device, and a storage medium, which are applied in the field of artificial intelligence, and especially relate to the technical field of spatio-temporal big data in big data technologies, to solve the problem of low speed in querying dynamic association relationships in the prior art. The inventive idea of the present disclosure lies in: during data storage, data is stored by time buckets, and during query, dynamic association information of a target entity can be found in a corresponding time bucket according to query starting and ending time, thereby improving query speed.

The following describes an application scenario of the present disclosure.

Figure 1:
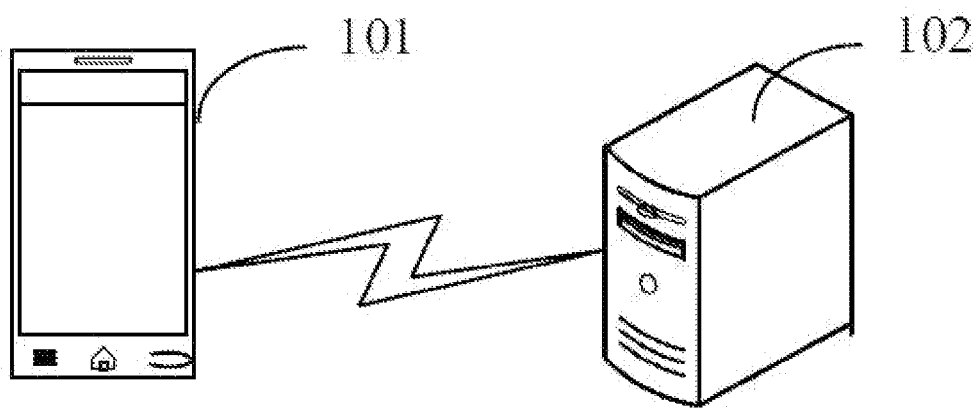
FIG. 1 is a schematic diagram of a scenario of a query method provided by an embodiment of the present disclosure.

FIG. 1 is a schematic diagram of a scenario of a query method provided by an embodiment of the present disclosure. As shown in FIG. 1, a query request is sent by a terminal device 101 to a server 102 to query dynamic association information of a certain target entity within a certain period of time. After receiving the query request sent by the terminal device 101, the server 102 may perform a query according to the query request, rank the queried dynamic association information of the target entity and then send it back to the terminal device 101.

The server 102 may be a server or a server in a cloud service platform. The terminal device 101 may be a mobile phone, a tablet computer (pad), a computer with wireless transceiver functions, a virtual reality (VR) terminal device, an augmented reality (AR) terminal device, a wireless terminal in industrial control, a wireless terminal in remote medical surgery, a wireless terminal in smart grid, a wireless terminal in smart home, etc. In the embodiments of the present disclosure, an apparatus for implementing functions of the terminal may be a terminal device, or an apparatus capable of supporting the terminal to implement the functions, such as a chip system, and the apparatus may be installed in the terminal device. In the embodiments of the present disclosure, the chip system may be composed of a chip, or may include a chip and other discrete devices.

It should be noted that the application scenario of the technical solution of the present disclosure may be the scenario in FIG. 1, but is not limited thereto, and it is also applicable to other scenarios that require an information query.

It can be understood that the foregoing query method may be implemented by a query apparatus provided in an embodiment of the present disclosure, and the query apparatus may be part or all of a certain device, for example, a server or a processor in the server.

The following takes a server integrated or installed with relevant executive codes as an example, and specific embodiments are used to describe the technical solutions of the embodiments of the present disclosure in detail. The following specific embodiments can be combined with each other, and same or similar concepts or processes may not be repeated in some embodiments.

Figure 2:
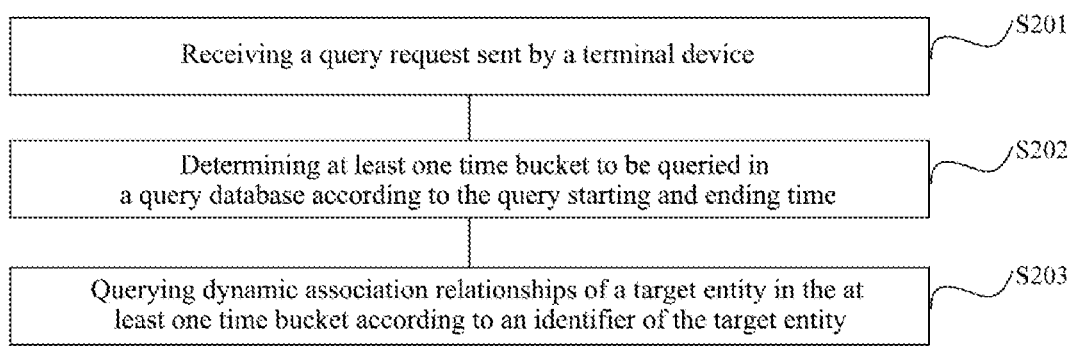
FIG. 2 is a schematic flowchart of a query method provided by an embodiment of the present disclosure.

FIG. 2 is a schematic flowchart of a query method provided by an embodiment of the present disclosure. This embodiment relates to a process of how to query dynamic associated information of a target entity. As shown in FIG. 2, the method includes:

S201: receiving a query request sent by a terminal device, where the query request is used to request to query dynamic association relationships of a target entity and includes an identifier of the target entity and query starting and ending time.

A dynamic association relationship may be an accompanying relationship between entities, and the embodiment of the present disclosure does not limit a type of the dynamic association relationship. Illustratively, the dynamic association relationship may be a within-a-same-frame relationship, that is, two entities are within a same building or vehicle. Illustratively, the dynamic association relationship may also be a companion relationship, that is, the paths that two entities move along are consistent. In addition, an entity can be a person or an object such as a car. The identifier of the target entity may be a person's identity card number, a vehicle's license plate number, a person's mobile phone number, etc.

In the present disclosure, when a user needs to query the dynamic association relationships of the target entity within a certain period of time, the user may send the query request to the server through the terminal device. After receiving the query request, the server may acquire the identifier of the target entity and the query starting and ending time from the query request.

In some embodiments, the query request may also include a type of a dynamic association relationship to reduce a scope of the query. Alternatively, the query request may also include paging parameters to determine the number of pages and the number of entries per page of a query result display interface.

In some embodiments, after receiving the query request, the server may also verify the query starting and ending time and the paging parameters in the query request. If the query starting and ending time exceeds queryable starting and ending time thresholds, or the paging parameters exceed paging parameter thresholds, the server may return an error prompt to the terminal device to prompt the user to re-enter the query request.

In some other embodiments, the server may store historical query records. After receiving the query request, the server may first verify whether the query request is in the historical query records. If the query request is in the historical query records, the server directly finds the dynamic association relationships of the target entity from the historical query records and feeds them back to the terminal device.

S202: determining at least one time bucket to be queried in a query database according to the query starting and ending time, where each time bucket stores the dynamic association relationships of the target entity in a time period corresponding to the time bucket.

In this step, after receiving the query request sent by the terminal device, the server may determine at least one time bucket to be queried in the query database according to the query starting and ending time.

Time bucketing can be performed by grouping, according to time and using a Hash value, the data under a name of a column into a same group, and having each bucket correspond to a storage file under the name of the column.

In some embodiments, the query database includes at least two types of time buckets, which illustratively may include monthly buckets, weekly buckets, and daily buckets. The monthly buckets are buckets that span a natural month. For example, Jan. 1 to 31, 2019 makes up a monthly bucket, and Apr. 1 to 30, 2019 makes up a monthly bucket. The weekly buckets are buckets spanning a natural week. For example, the first week of May 2019 makes up a weekly bucket, and the fourth week of August 2019 makes up a weekly bucket. The daily buckets are buckets that span a natural day. For example, there are 365 or 366 daily buckets in a year. It should be noted that there are only four weekly buckets per month, and there are 365 or 366 daily buckets in a year.

Correspondingly, in some embodiments, the server may determine a minimum amount of time buckets used to cover the query starting and ending time as the at least one time bucket to be queried in the query database.

Illustratively, if the query starting and ending time entered by the user is Jan. 1 to 20, 2019, the server may determine that time buckets to be queried in the query database are two weekly buckets of the first week and the second week of 2019 as well as six daily buckets of Jan. 15 to 20, 2019.

S203: querying the dynamic association relationships of the target entity in the at least one time bucket according to the identifier of the target entity.

In this step, after determining the at least one time bucket to be queried in the query database according to the query starting and ending time, the server may query the dynamic association relationships of the target entity according to the identifier of the target entity in the at least one time bucket.

In some embodiments, the server may first generate a structured query language (SQL) corresponding to the query request. Subsequently, the server queries the dynamic association relationships of the target entity in the at least one time bucket according to the SQL.

Embodiments of the present disclosure do not limit how the server converts the query request into the corresponding SQL, and an appropriate method may be adopted according to the actual situation.

In some embodiments, the dynamic association relationships of the target entity acquired by the query of the server may be in a form of an adjacency list. The adjacency list is a storage structure that combines sequential allocation and chain allocation.

In the query method provided by the embodiments of the present disclosure, a server first receives a query request sent by a terminal device, where the query request is used to request to query dynamic association relationships of a target entity and includes an identifier of the target entity and query starting and ending time. Subsequently, the server determines at least one time bucket to be queried in the query database according to the query starting and ending time, where each time bucket stores the dynamic association relationships of the target entity in a time period corresponding to the time bucket. Finally, the server queries the dynamic association relationships of the target entity in the at least one time bucket. Compared with the prior art, the present disclosure uses a time bucketing method to query dynamic associated information of the target entity, which allows for effectively reducing the calculation burden and improving the speed for querying the dynamic association information.

Figure 3:
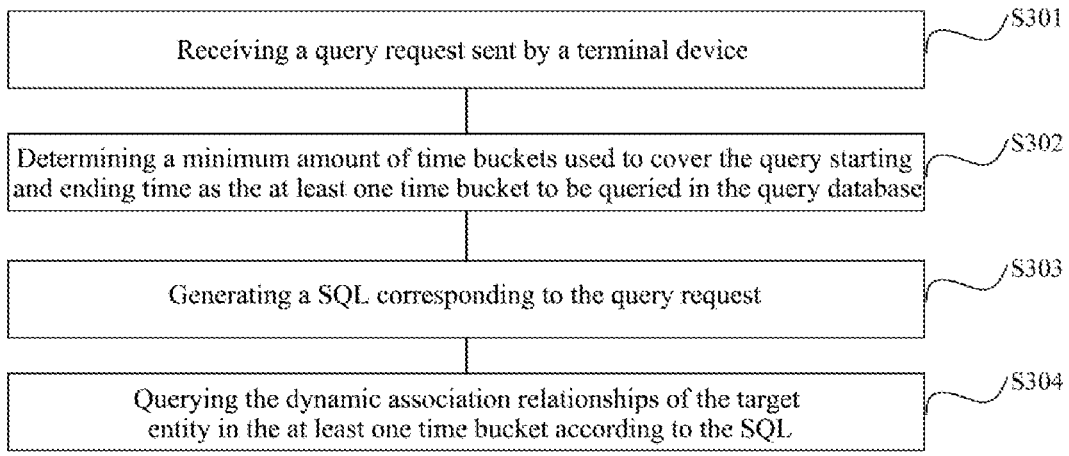
FIG. 3 is a schematic flowchart of another query method provided by an embodiment of the present disclosure.

On the basis of the foregoing embodiments, the following describes how the server determines the time buckets and performs the query. FIG. 3 is a schematic flowchart of another query method provided by an embodiment of the present disclosure. As shown in FIG. 3, the query method includes:

S301: receiving a query request sent by a terminal device, where the query request is used to request to query dynamic association relationships of a target entity and includes an identifier of the target entity and query starting and ending time.

Technical terms, technical effects, technical features, and alternative implementations of S301 can be understood with reference to S201 shown in FIG. 2, and the repeated content will not be provided here again.

S302: determining a minimum amount of time buckets used to cover the query starting and ending time as the at least one time bucket to be queried in the query database.

The query database includes at least two types of time buckets.

In this step, after receiving the query request sent by the terminal device, the server may determine the minimum amount of time buckets used to cover the query starting and ending time as the at least one time bucket to be queried in the query database.

Illustratively, taking the time buckets including weekly buckets and daily buckets as an example, if the query starting and ending time entered by the user is Jan. 1 to 20, 2019, the server may determine that time buckets to be queried in the query database are two weekly buckets of the first week and the second week of 2019 as well as six daily buckets of Jan. 15 to 20, 2019.

S303: generating a SQL corresponding to the query request.

In the step, after determining the minimum amount of time buckets used to cover the query starting and ending time as the at least one time bucket to be queried in the query database, the server may generate the SQL corresponding to the query request.

Embodiments of the disclosure do not limit how the server converts the query request into the corresponding SQL, and an appropriate method may be adopted according to the actual situation.

S304: querying the dynamic association relationships of the target entity in the at least one time bucket according to the SQL.

In this step, after generating the SQL corresponding to the query request, the server may query the dynamic association relationships of the target entity in the at least one time bucket based on the SQL.

Figure 4:
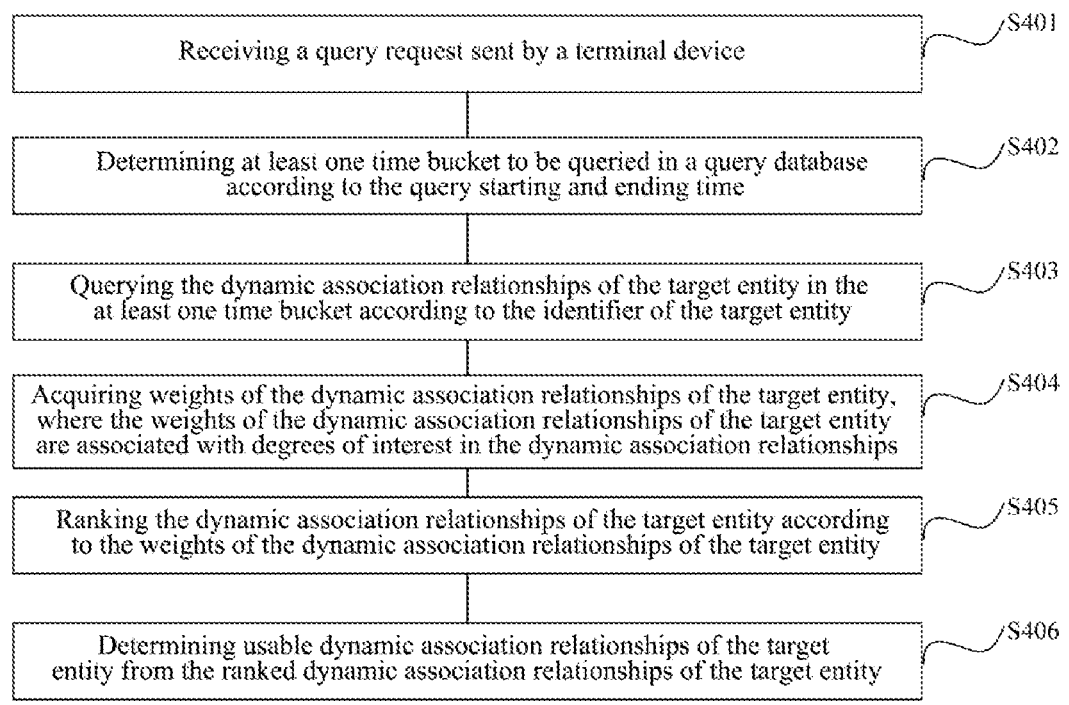
FIG. 4 is a schematic flowchart of still another query method provided by an embodiment of the present disclosure.

On the basis of the foregoing embodiments, the following describes the server determining usable dynamic association relationships of the target entity from the dynamic association relationships of the target entity. FIG. 4 is a schematic flowchart of still another query method provided by an embodiment of the present disclosure. As shown in FIG. 4, the query method includes:

S401: receiving a query request sent by a terminal device, where the query request is used to request to query dynamic association relationships of a target entity and includes an identifier of the target entity and query starting and ending time.

S402. determining at least one time bucket to be queried in a query database according to the query starting and ending time, where each time bucket stores the dynamic association relationships of the target entity in a time period corresponding to the time bucket.

S403: querying the dynamic association relationships of the target entity in the at least one time bucket according to the identifier of the target entity.

Technical terms, technical effects, technical features, and alternative implementations of S401-S403 can be understood with reference to S201-S203 shown in FIG. 2, and the repeated content will not be provided here again.

S404: acquiring weights of the dynamic association relationships of the target entity, where the weights of the dynamic association relationships of the target entity are associated with degrees of interest in the dynamic association relationships.

In the present disclosure, after querying and obtaining the dynamic association relationships of the target entity, the server may acquire the weights of the dynamic association relationships of the target entity to rank the weights of the dynamic association relationships of the target entity.

Embodiments of the present disclosure do not limit how to determine the weights of the dynamic association relationships of the target entity. In an optional implementation, the weights of the dynamic association relationships of the target entity are associated with the degrees of interest in the dynamic association relationships. Illustratively, if a person is of interest to the police, a high degree of interest may be set to the person. Correspondingly, the server may also set a high weight to the person when performing the ranking.

In other embodiments, the weights of the dynamic association relationships of the target entity may also be related to a density of collection devices. Illustratively, if a 100-meter intersection includes 50 cameras, the dynamic association relationships of the target entity collected by the 50 cameras can be set with lower weights. Illustratively, if a 100-meter intersection includes one camera, the dynamic association relationships of the target entity collected by the one camera can be set with higher weights.

In addition, the weights of the dynamic association relationships of the target entity may also be associated with division of a time window, division of a spatial window, and pixel binning.

S405: ranking the dynamic association relationships of the target entity according to the weights of the dynamic association relationships of the target entity.

In this step, after acquiring the weights of the dynamic association relationships of the target entity, the server may rank the dynamic association relationships of the target entity according to the weights of the dynamic association relationships of the target entity.

In some embodiments, the dynamic association relationships of the target entity may be ranked based on a product of an occurrence frequency and a weight of a dynamic association relationship of the target entity.

In some other embodiments, if the occurrence frequency of the dynamic association relationship of the target entity exceeds a frequency threshold, the dynamic association relationship of the target entity is determined to be abnormal. At this time, the server may delete the abnormal dynamic association relationship of the target entity, thereby improving the ranking accuracy.

In addition, the server may also set a blacklist and whitelist when performing the ranking. For privacy and security considerations, dynamic association relationships in the blacklist can be removed. Positions of dynamic association relationships in the whitelist may be placed forward in the ranking.

S406: determining usable dynamic association relationships of the target entity from the ranked dynamic association relationships of the target entity.

In this step, after ranking the dynamic association relationships of the target entity according to the weights of the dynamic association relationships of the target entity, the server may determine the usable dynamic association relationships of the target entity from the ranked dynamic association relationships of the target entity.

The usable dynamic association relationships of the target entity may include those of the most queries and of the hottest queries.

In some embodiments, since some dynamic association relationships, such as the within-a-same-frame relationship, obey normal distribution, some ranked dynamic association relationships of the target entity with smaller weights and more inputs can be regarded as useless data and deleted.

In the query method provided by the embodiments of the present disclosure, the server acquires the weights of the dynamic association relationships of the target entity, where the weights of the dynamic association relationships of the target entity are associated with degrees of interest in the dynamic association relationships. Subsequently, the server ranks the dynamic association relationships of the target entity according to the weights of the dynamic association relationships of the target entity. Finally, the server determines the usable dynamic relationships of the target entity from the ranked dynamic relationships of the target entity. Compared with the prior art, the present disclosure adopts a method of querying and then ranking, which allows for an increase in the query speed and a reduction in an amount of data to be ranked.

Figure 5:
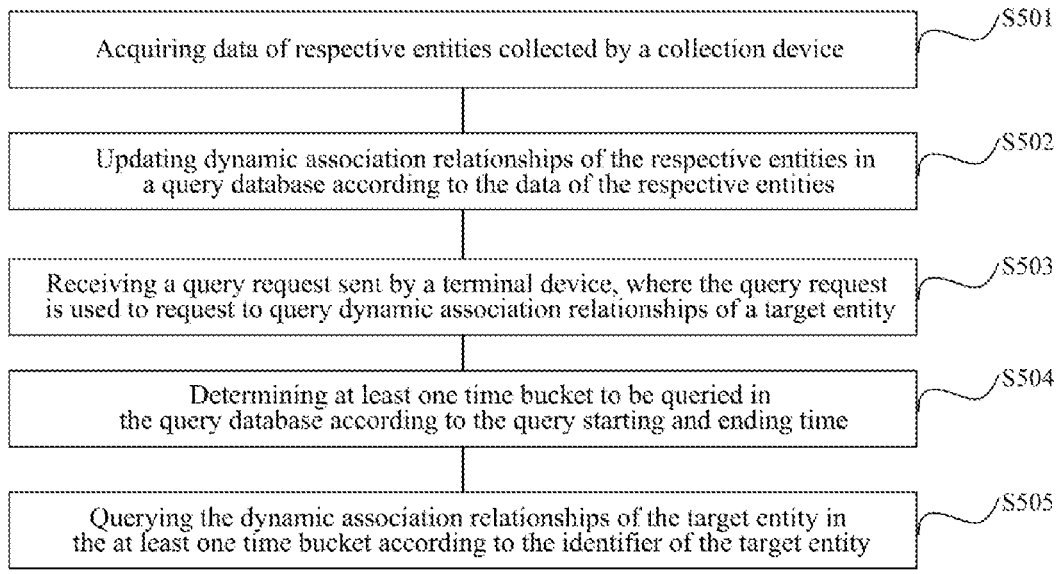
FIG. 5 is a schematic flowchart of yet another query method provided by an embodiment of the present disclosure.

On the basis of the foregoing embodiments, the server may also be provided with an offline system before performing a query, where the offline system is configured to update the dynamic association relationships of each entity in the database. FIG. 5 is a schematic flowchart of yet another query method provided by an embodiment of the present disclosure. As shown in FIG. 5, the query method includes:

S501: acquiring data of respective entities collected by a collection device;

S502: updating dynamic association relationships of the respective entities in a query database according to the data of the respective entities.

S503: receiving a query request sent by a terminal device, where the query request is used to request to query dynamic association relationships of a target entity and includes an identifier of the target entity and query starting and ending time.

S504: determining at least one time bucket to be queried in the query database according to the query starting and ending time, where each time bucket stores the dynamic association relationships of the target entity in a time period corresponding to the time bucket.

S505: querying the dynamic association relationships of the target entity in the at least one time bucket according to the identifier of the target entity.

Figure 6:
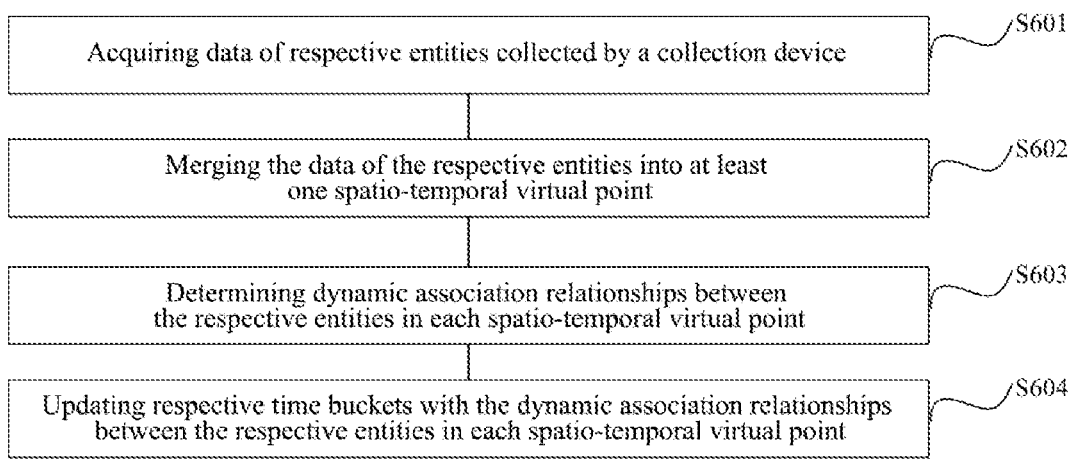
FIG. 6 is a schematic flowchart of yet another query method provided by an embodiment of the present disclosure.

On the basis of FIG. 5, the following describes how to update the dynamic association relationships of respective entities in the database. FIG. 6 is a schematic flowchart of yet another query method provided by an embodiment of the present disclosure. As shown in FIG. 6, the query method includes:

S601: acquiring data of respective entities collected by a collection device.

In some embodiments, the server may extract a specified column of data of respective entities from the data of respective entities collected by the collection device based on a description file of a data format of the collection device, so that the data of respective entities are formed with a format of the entity's identifier, a geographic scope and a time scope.

In some embodiments, after acquiring the data of respective entities collected by the collection device, the server may also pre-process the data of respective entities to filter out at least one piece of invalid data in the data of respective entities, where the invalid data includes an invalid entity identifier, an invalid geographic location and an invalid time, thereby improving the speed of data update and data storage, and ensuring the accuracy of the updated dynamic relationships.

S602: merging the data of respective entities into at least one spatio-temporal virtual point, where the spatio-temporal virtual point is a triplet composed of longitude, latitude and time.

The setting of the spatio-temporal virtual point can be specifically set according to actual conditions. Illustratively, a spatio-temporal virtual point may be set every 1,000 meters and every 6 hours.

In some embodiments, if a geographic location and time corresponding to data of a certain entity are within a scope of a certain spatio-temporal virtual point, the data of this entity may be merged into this spatio-temporal virtual point.

In some embodiments, after merging the data of respective entities into the at least one spatio-temporal virtual point, the server may also perform a normalization processing on the data of respective entities in each spatio-temporal virtual point. An optional normalization method is density-based clustering. Specifically, if between different data recorded for a same entity in each spatio-temporal virtual point a distance is less than a second distance threshold and a time difference is less than a second time threshold, the different data of the same entity are normalized into one piece of data.

Illustratively, a spatio-temporal virtual point includes three sets of vehicle data. The three sets of vehicle data are: Hu A36F77, E121.36040, N121.29720, T1561946400; Hu A36F77, E121.36040, N121.29720, T1561946401; and Hu A36F77, E121.36040, N121.29720, T1561946402, where E is east longitude and N is north latitude. Since there are 3 records in 3 consecutive seconds for the vehicle Hu A36F77 at a same location, this may be regarded as one collection action and the three sets of vehicle data are normalized into one set of data.

In the present disclosure, by normalizing the data, the amount of data during query can be reduced to further improve the query speed.

S603: determining dynamic association relationships between respective entities in each spatio-temporal virtual point.

Embodiments of the present disclosure do not limit how to determine the dynamic association relationships between respective entities in each spatio-temporal virtual point, and specific determination may be made according to the types of the dynamic association relationships.

In an optional implementation, a dynamic association relationship is the within-a-same-frame relationship, and accordingly, it is determined that there is a within-a-same-frame relationship between two entities in a spatio-temporal virtual point if a distance between the two entities is less than a first distance threshold and a time difference between the two entities is less than a first time threshold.

In some embodiments, after determining the dynamic association relationships between respective entities in each spatio-temporal virtual point, the server may correspondingly acquire an adjacency list of the dynamic association relationships between respective entities.

S604: updating respective time buckets with the dynamic association relationships between respective entities in each spatio-temporal virtual point.

In this step, after determining the dynamic association relationships between respective entities in each spatio-temporal virtual point, the server may update respective time buckets with the dynamic association relationships between respective entities in each spatio-temporal virtual point.

Illustratively, taking time buckets including monthly buckets, weekly buckets, and daily buckets as an example, the server may first calculate monthly buckets, weekly buckets, and daily buckets to which the dynamic association relationships between respective entities belong, and then the server may aggregate the dynamic association relationships between respective entities or the adjacency list corresponding to the dynamic association relationships between respective entities into the corresponding monthly buckets, weekly buckets, and daily buckets.

In addition, the present disclosure also supports access of data of multiple representation types, and only an offline data stream in the database needs to be maintained, which reduces maintenance costs. Data delay scenarios are supported, which can solve the problem of conflicts caused by simultaneous writing to the database.

In the query method provided by the embodiments of the present disclosure, the server first acquires the data of respective entities collected by the collection device. Second, the server merges the data of respective entities into at least one spatio-temporal virtual point which is a triplet composed of longitude, latitude, and time. Third, the server determines the dynamic association relationships between respective entities in each spatio-temporal virtual point. Finally, the server updates respective time buckets with the dynamic association relationships between respective entities in each spatio-temporal virtual point. Compared with the prior art, by division into spatio-temporal virtual points and sequentially updating the respective time buckets in the database with the dynamic association relationships between respective entities, it is possible to only calculate the within-a-same-frame ranking in each bucket during the query, thus reducing the amount of calculation.

A person of ordinary skill in the art can understand that all or part of the steps of the above method embodiments can be implemented by hardware related to program information, and the foregoing program can be stored in a computer readable storage medium, and the program, when executed, performs the steps including the foregoing method embodiments, and the foregoing storage medium includes: an ROM, an RAM, a magnetic disk, or an optical disk and other media that can store program codes.

Figure 7:
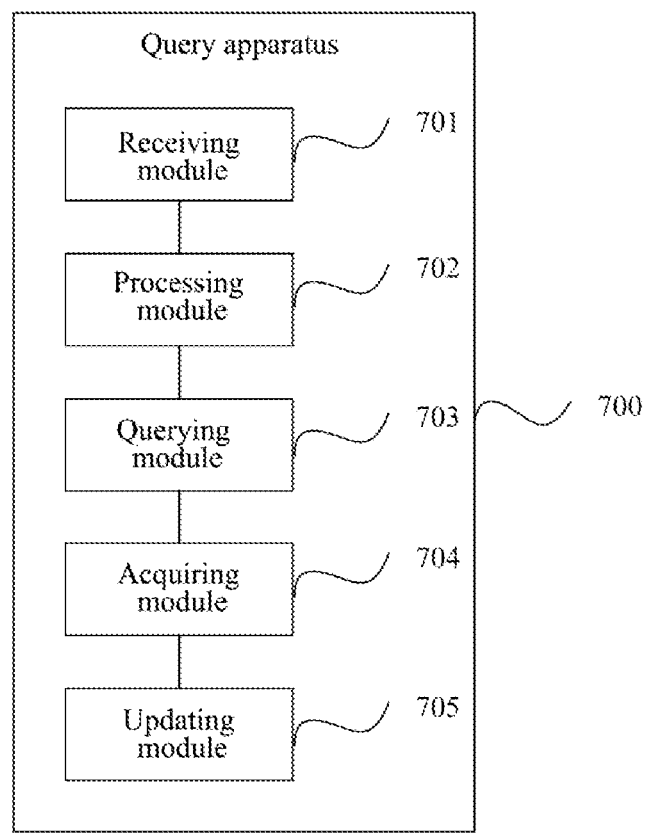
FIG. 7 is a schematic structural diagram of a query apparatus provided by an embodiment of the present disclosure.

FIG. 7 is a schematic structural diagram of a query apparatus provided by an embodiment of the present disclosure. The query apparatus may be implemented by software, hardware, or a combination thereof, and for example, the server or a chip in the server for executing the foregoing query method. As shown in FIG. 7, the query apparatus 700 includes: a receiving module 701, a processing module 702, a querying module 703, an acquiring module 704, and an updating module 705.

The receiving module 701 is configured to receive a query request sent by a terminal device, where the query request is used to request to query dynamic association relationships of a target entity and includes an identifier of the target entity and query starting and ending time.

The processing module 702 is configured to determine at least one time bucket to be queried in a query database according to the query starting and ending time, where each time bucket stores the dynamic association relationships of the target entity in a time period corresponding to the time bucket.

The querying module 703 is configured to query the dynamic association relationships of the target entity in the at least one time bucket according to the identifier of the target entity.

In an optional implementation, the query database includes at least two types of time buckets, and each type of time bucket corresponds to a different duration. The processing module 702 is specifically configured to determine a minimum amount of time buckets used to cover the query starting and ending time as the at least one time bucket to be queried in the query database.

In an optional implementation, the querying module 703 is specifically configured to: generate a structured query language (SQL) corresponding to the query request; and query the dynamic association relationships of the target entity in the at least one time bucket according to the SQL.

In an optional implementation, the following are further included:

the acquiring module 704 is configured to acquire weights of the dynamic association relationships of the target entity, where the weights of the dynamic association relationships of the target entity are associated with degrees of interest in the dynamic association relationships; and the processing module 702 is further configured to: rank the dynamic association relationships of the target entity according to the weights of the dynamic association relationships of the target entity; and determine usable dynamic association relationships of the target entity from the ranked dynamic association relationships of the target entity.

In an optional implementation, the processing module 702 is further configured to: determine a dynamic association relationship of the target entity to be abnormal if an occurrence frequency of the dynamic association relationship of the target entity exceeds a frequency threshold; and delete the abnormal dynamic association relationship of the target entity.

In an optional implementation, the following is further included:

the updating module 705 is configured to: acquire data of respective entities collected by a collection device; and update dynamic association relationships of the respective entities in the query database according to the data of the respective entities.

In an optional implementation, the updating module 705 is specifically configured to: merge the data of the respective entities into at least one spatio-temporal virtual point, where the spatio-temporal virtual point is a triplet composed of longitude, latitude and time; determine dynamic association relationships between the respective entities in each spatio-temporal virtual point; and update respective time buckets with the dynamic association relationships between the respective entities in each spatio-temporal virtual point.

In an optional implementation, the dynamic association relationships include a within-a-same-frame relationship.

In an optional implementation, the updating module 705 is specifically configured to determine that there is a within-a-same-frame relationship between two entities in a spatio-temporal virtual point if a distance between the two entities is less than a first distance threshold and a time difference between the two entities is less than a first time threshold.

In an optional implementation, the updating module 705 is further configured to pre-process the data of the respective entities to filter out at least one piece of invalid data in the data of the respective entities, where the invalid data includes an invalid entity identifier, an invalid geographic location, and an invalid time.

In an optional implementation, the updating module 705 is further configured to normalize the data of the respective entities in each spatio-temporal virtual point.

In an optional implementation, the updating module 705 is further configured to normalize, if between different data recorded for a same entity in each spatio-temporal virtual point a distance is less than a second distance threshold and a time difference is less than a second time threshold, the different data of the same entity into one piece of data.

The query apparatus provided in the embodiments of the present disclosure can execute the actions of the query method in the above method embodiments, and their implementation principles and technical effects are similar, and will not be repeated here.

According to the embodiments of the present disclosure, the present disclosure also provides an electronic device and a readable storage medium.

Figure 8:
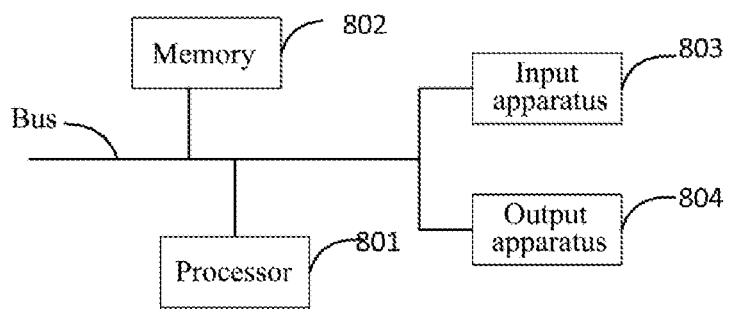
FIG. 8 is a block diagram of an electronic device for implementing the query method of an embodiment of the present disclosure.

As shown in FIG. 8, it is a block diagram of an electronic device according to the query method of an embodiment of the present disclosure. The electronic device is intended to represent various forms of digital computers, such as laptop computers, desktop computers, workstations, personal digital assistants, servers, blade servers, mainframe computers, and other suitable computers. The electronic device can also represent various forms of mobile devices, such as personal digital processing, cellular phones, smart phones, wearable devices, and other similar computing devices. The components shown herein, connections and relationships therebetween, and functions thereof are merely exemplary, and are not intended to limit the implementation of the present disclosure described and/or required herein.

As shown in FIG. 8, the electronic device includes: one or more processors 801, a memory 802, and interfaces for connecting various components, including a high-speed interface and a low-speed interface. The various components are connected to each other by using different buses, and can be installed on a common motherboard or installed in other ways as required. The processor may process instructions executed in the electronic device, including instructions stored in or on the memory to display graphical information of a GUI on an external input/output device (such as a display device coupled to an interface). In other embodiments, multiple processors and/or multiple buses may be used with multiple memories if necessary. Similarly, multiple electronic devices can be connected, and each device provides some necessary operations (for example, as a server array, a group of blade servers, or a multi-processor system). A processor 801 is taken as an example in FIG. 8.

The memory 802 is a non-transitory computer-readable storage medium provided by the present disclosure. The memory stores instructions executable by at least one processor, so that the at least one processor executes the query method provided in the present disclosure. The non-transitory computer-readable storage medium of the present disclosure stores computer instructions, which are used to enable the computer to execute the query method provided in the present disclosure.

The memory 802, as a non-transitory computer-readable storage medium, may be used to store non-transitory software programs, non-transitory computer-executable programs and modules, such as program instructions/modules corresponding to the query method in the embodiments of the present disclosure (for example, the receiving module 701, the processing module 702, the querying module 703, the acquiring module 704, and the updating module 705 shown in FIG. 7). The processor 801 executes various functional applications and data processing of the server, i.e., implementing the query method in the foregoing method embodiments, by running non-transient software programs, instructions, and modules stored in the memory 802.

The memory 802 may include a program storage area and a data storage area, where the program storage area may store an operating system, and an application program required by at least one function; the storage data area may store data created by the use of the electronic device for the query. In addition, the memory 802 may include a high-speed random access memory, and may also include a non-transitory memory, such as at least one magnetic disk storage device, a flash memory device, or other non-transitory solid-state storage devices. In some embodiments, the memory 802 may optionally include memories remotely provided with respect to the processor 801, and these remote memories may be connected to the electronic device for the query via a network. Examples of the aforementioned networks include, but are not limited to, the Internet, corporate intranets, local area networks, mobile communication networks, and combinations thereof.

The electronic device for the query method may further include: an input apparatus 803 and an output apparatus 804. The processor 801, the memory 802, the input apparatus 803, and the output apparatus 804 may be connected through a bus or in other ways. The connection through a bus is taken as an example in FIG. 8.

The input apparatus 803 may receive input digital or character information, and generate key signal input related to user settings and function control of the electronic device for the query, such as a touch screen, a keypad, a mouse, a track-pad, a touch pad, a pointing stick, one or more mouse buttons, a trackball, a joystick and other input apparatuses. The output apparatus 804 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some implementations, the display device may be a touch screen.

Various implementations of the systems and technologies described herein can be implemented in digital electronic circuit systems, integrated circuit systems, application specific ASICs (application specific integrated circuits), computer hardware, firmware, software, and/or combinations thereof. These various implementations may include: implementation in one or more computer programs that can be executed and/or interpreted on a programmable system including at least one programmable processor. The programmable processor may be a dedicated or general programmable processor, which can receive data and instructions from a storage system, at least one input apparatus, and at least one output apparatus, and transmit the data and instructions to the storage system, the at least one input apparatus, and the at least one output apparatus.

These computer programs (also called programs, software, software applications, or codes) include machine instructions for programmable processors, and high-level procedures and/or object-oriented programming languages, and/or assembly/machine language can be used to implement these computer programs. As used herein, the terms "machine-readable medium" and "computer-readable medium" refer to any computer program product, device, and/or apparatus used to provide machine instructions and/or data to a programmable processor (for example, magnetic disks, optical disks, memory, programmable logic devices (PLD)), including machine-readable media that receive machine instructions as machine-readable signals. The term "machine-readable signal" refers to any signal used to provide machine instructions and/or data to a programmable processor.

In order to provide interaction with users, the systems and techniques described here can be implemented on a computer that has: a display apparatus used to display information to users (for example, CRT (Cathode Ray Tube) or LCD (Liquid Crystal Display) monitors); and a keyboard and a pointing apparatus (for example, a mouse or a trackball), through which the user can provide input to the computer. Other types of devices can also be used to provide interaction with users; for example, the feedback provided to the user can be any form of sensory feedback (for example, visual feedback, auditory feedback, or tactile feedback); and any form of input (including sound input, voice input or tactile input) can be used to receive input from the user.

The systems and technologies described herein can be implemented in a computing system that includes back-end components (for example, as a data server), or a computing system that includes middleware components (for example, an application server), or a computing system that includes front-end components (for example, a user computer with a graphical user interface or web browser, through which the user can interact with the implementation of the system and technology described herein), or a computing system including any combination of such back-end components, middleware components, or front-end components. The components of the system can be connected to each other through any form or medium of digital data communication (for example, a communication network). Examples of communication networks include: local area network (LAN), wide area network (WAN), and the Internet.

The computer system can include clients and servers. The clients and servers are generally far away from each other and usually interact through a communication network. The relationship between the clients and the servers is generated through computer programs running on corresponding computers and having a client-server relationship with each other.

According to the technical solution of the embodiments of the present disclosure, a query request sent by a terminal device is received, where the query request is used to request to query dynamic association relationships of a target entity and includes an identifier of the target entity and query starting and ending time; at least one time bucket to be queried in the query database is determined according to the query starting and ending time, where each time bucket stores the dynamic association relationships of the target entity in a time period corresponding to the time bucket; and the dynamic association relationships of the target entity are queried in the at least one time bucket. Compared with the prior art, the present disclosure uses a time bucketing method to query dynamic associated information of the target entity, which allows for effectively reducing the calculation burden and improving the speed for querying the dynamic association information.

It should be understood that the various forms of processes shown above can be used to reorder, add or delete steps. For example, the steps described in the present disclosure can be executed in parallel, sequentially, or in a different order, as long as the desired result of the technical solution disclosed in the present disclosure can be achieved, which is not limited herein.

The foregoing specific implementations do not constitute a limitation on the protection scope of the present disclosure. Those skilled in the art should understand that various modifications, combinations, sub-combinations, and substitutions can be made according to design requirements and other factors. Any amendments, equivalent substitutions and improvements made within the spirit and principles of this disclosure shall be included in the scope of protection of this application.

What is claimed is:

1. A query method, comprising:
   receiving a query request sent by a terminal device, wherein the query request is used to request to query dynamic association relationships of a target entity and comprises an identifier of the target entity and query starting and ending time, and a dynamic association relationship is an accompanying relationship between the target entity and another entity;
   determining at least one time bucket to be queried in a query database according to the query starting and ending time, wherein each time bucket stores the dynamic association relationships of the target entity in a time period corresponding to the time bucket; and
   querying the dynamic association relationships of the target entity in the at least one time bucket according to the identifier of the target entity;
   wherein the query database comprises at least two types of time buckets, and each type of time bucket corresponds to a different duration, and each dynamic association relationship of the dynamic association relationships is stored in the each type of time bucket; and
   the determining the at least one time bucket to be queried in the query database according to the query starting and ending time comprises:
   determining a minimum amount of time buckets used to cover the query starting and ending time as the at least one time bucket to be queried in the query database;
   before the receiving the query request sent by the terminal device, the method further comprises:
   acquiring data of respective entities collected by a collection device; and
   updating dynamic association relationships of the respective entities in the query database according to the data of the respective entities,
   wherein the updating the dynamic association relationships of the respective entities in the query database according to the data of the respective entities, comprises:
   merging the data of the respective entities into at least one spatio-temporal virtual point, wherein the spatio-temporal virtual point is a triplet composed of longitude, latitude, and time;
   determining dynamic association relationships between the respective entities in each spatio-temporal virtual point; and
   updating respective time buckets with the dynamic association relationships between the respective entities in each spatio-temporal virtual point.

2. The method according to claim 1, wherein the querying the dynamic association relationships of the target entity in the at least one time bucket according to the identifier of the target entity comprises:
   generating a structured query language (SQL) corresponding to the query request; and
   querying the dynamic association relationships of the target entity in the at least one time bucket according to the SQL.

3. The method according to claim 1, after the querying the dynamic association relationships of the target entity in the at least one time bucket according to the identifier of the target entity, further comprising:
   acquiring weights of the dynamic association relationships of the target entity, wherein the weights of the dynamic association relationships of the target entity are associated with degrees of interest in the dynamic association relationships;
   ranking the dynamic association relationships of the target entity according to the weights of the dynamic association relationships of the target entity; and
   determining usable dynamic association relationships of the target entity from the ranked dynamic association relationships of the target entity.

4. The method according to claim 3, before the determining the usable dynamic association relationships of the target entity from the ranked dynamic association relationships of the target entity, further comprising:
   determining a dynamic association relationship of the target entity to be abnormal if an occurrence frequency of the dynamic association relationship of the target entity exceeds a frequency threshold; and
   deleting the abnormal dynamic association relationship of the target entity.

5. The method according to claim 1, wherein the dynamic association relationships comprise a within-a-same-frame relationship, and the determining the dynamic association relationships between the respective entities in each spatio-temporal virtual point comprises:
- determining that there is a within-a-same-frame relationship between two entities in a spatio-temporal virtual point if a distance between the two entities is less than a first distance threshold and a time difference between the two entities is less than a first time threshold.

6. The method according to claim 1, after the acquiring data of respective entities collected by the collection device, further comprising:
- pre-processing the data of the respective entities to filter out at least one piece of invalid data in the data of the respective entities, wherein the invalid data comprises an invalid entity identifier, an invalid geographic location, and an invalid time.

7. The method according to claim 1, after the merging the data of the respective entities into at least one spatio-temporal virtual point, further comprising:
- if, between different data recorded for a same entity in each spatio-temporal virtual point, a distance is less than a second distance threshold and a time difference is less than a second time threshold, normalizing the different data of the same entity into one piece of data.

8. A non-transitory computer-readable storage medium storing computer instructions for causing a computer to execute the method according to claim 1.

9. A query apparatus, comprising:
- at least one processor; and
- a memory communicatively connected with the at least one processor;
- wherein the memory stores instructions executable by the at least one processor, and the instructions are executed by the at least one processor to enable the at least one processor to:
- receive a query request sent by a terminal device, wherein the query request is used to request to query dynamic association relationships of a target entity and comprises an identifier of the target entity and query starting and ending time, and a dynamic association relationship is an accompanying relationship between the target entity and another entity;
- determine at least one time bucket to be queried in a query database according to the query starting and ending time, wherein each time bucket stores the dynamic association relationships of the target entity in a time period corresponding to the time bucket; and
- query the dynamic association relationships of the target entity in the at least one time bucket according to the identifier of the target entity;
- wherein the query database comprises at least two types of time buckets, and each type of time bucket corresponds to a different duration, and each dynamic association relationship of the dynamic association relationships is stored in the each type of time bucket; and the instructions are executed by the at least one processor to enable the at least one processor to determine a minimum amount of time buckets used to cover the query starting and ending time as the at least one time bucket to be queried in the query database; and
- wherein the instructions are executed by the at least one processor to enable the at least one processor to:
- acquire data of respective entities collected by a collection device; merge the data of the respective entities into at least one spatio-temporal virtual point, wherein the spatio-temporal virtual point is a triplet composed of longitude, latitude, and time; determine dynamic association relationships between the respective entities in each spatio-temporal virtual point; and update respective time buckets with the dynamic association relationships between the respective entities in each spatio-temporal virtual point.

10. The apparatus according to claim 9, wherein the instructions are executed by the at least one processor to enable the at least one processor to: generate a structured query language (SQL) corresponding to the query request; and query the dynamic association relationships of the target entity in the at least one time bucket according to the SQL.

11. The apparatus according to claim 9, wherein the instructions are executed by the at least one processor to enable the at least one processor to:
- acquire weights of the dynamic association relationships of the target entity, wherein the weights of the dynamic association relationships of the target entity are associated with degrees of interest in the dynamic association relationships;
- rank the dynamic association relationships of the target entity according to the weights of the dynamic association relationships of the target entity; and determine usable dynamic association relationships of the target entity from the ranked dynamic association relationships of the target entity.

12. The apparatus according to claim 11, wherein the instructions are executed by the at least one processor to enable the at least one processor to: determine a dynamic association relationship of the target entity to be abnormal if an occurrence frequency of the dynamic association relationship of the target entity exceeds a frequency threshold; and delete the abnormal dynamic association relationship of the target entity.

13. The apparatus according to claim 9, wherein the dynamic association relationships comprise a within-a-same-frame relationship, and wherein the instructions are executed by the at least one processor to enable the at least one processor to determine that there is a within-a-same-frame relationship between two entities in a spatio-temporal virtual point if a distance between the two entities is less than a first distance threshold and a time difference between the two entities is less than a first time threshold.

14. The apparatus according to claim 9, wherein the instructions are executed by the at least one processor to enable the at least one processor to pre-process the data of the respective entities to filter out at least one piece of invalid data in the data of the respective entities, wherein the invalid data comprises an invalid entity identifier, an invalid geographic location, and an invalid time.

15. The apparatus according to claim 9, wherein the instructions are executed by the at least one processor to enable the at least one processor to normalize, if between different data recorded for a same entity in each spatio-temporal virtual point, a distance is less than a second distance threshold and a time difference is less than a second time threshold, the different data of the same entity into one piece of data.

16. A query method, comprising:
- determining at least one time bucket to be queried in a query database according to query starting and ending time in a query request, wherein each time bucket stores dynamic association relationships of an entity in a time period corresponding to the time bucket; and
- querying dynamic association relationships of a target entity in the query request in the at least one time bucket;
- wherein the query database comprises at least two types of time buckets, and each type of time bucket corresponds to a different duration, and each dynamic association relationship of the dynamic association relationships is stored in the each type of time bucket; and the determining the at least one time bucket to be queried in the query database according to the query starting and ending time comprises:

determining a minimum amount of time buckets used to cover the query starting and ending time as the at least one time bucket to be queried in the query database;

wherein before the determining the at least one time bucket to be queried in the query database according to the query starting and ending time in the query request, the method further comprises:

acquiring data of respective entities collected by a collection device; and updating dynamic association relationships of the respective entities in the query database according to the data of the respective entities, wherein the updating the dynamic association relationships of the respective entities in the query database according to the data of the respective entities, comprises:

merging the data of the respective entities into at least one spatio-temporal virtual point, wherein the spatio-temporal virtual point is a triplet composed of longitude, latitude, and time;

determining dynamic association relationships between the respective entities in each spatio-temporal virtual point; and updating respective time buckets with the dynamic association relationships between the respective entities in each spatio-temporal virtual point.

17. The method according to claim 16, after the querying the dynamic association relationships of the target entity in the at least one time bucket according to the identifier of the target entity, further comprising:

acquiring weights of the dynamic association relationships of the target entity, wherein the weights of the dynamic association relationships of the target entity are associated with degrees of interest in the dynamic association relationships;

ranking the dynamic association relationships of the target entity according to the weights of the dynamic association relationships of the target entity; and determining usable dynamic association relationships of the target entity from the ranked dynamic association relationships of the target entity.

18. The method according to claim 16, wherein the dynamic association relationships comprise a within-a-same-frame relationship, and the determining the dynamic association relationships between the respective entities in each spatio-temporal virtual point comprises:

determining that there is a within-a-same-frame relationship between two entities in a spatio-temporal virtual point if a distance between the two entities is less than a first distance threshold and a time difference between the two entities is less than a first time threshold.

19. The method according to claim 16, after the acquiring data of respective entities collected by the collection device, further comprising:

pre-processing the data of the respective entities to filter out at least one piece of invalid data in the data of the respective entities, wherein the invalid data comprises an invalid entity identifier, an invalid geographic location, and an invalid time.

20. The method according to claim 16, after the merging the data of the respective entities into at least one spatio-temporal virtual point, further comprising:

if, between different data recorded for a same entity in each spatio-temporal virtual point, a distance is less than a second distance threshold and a time difference is less than a second time threshold, normalizing the different data of the same entity into one piece of data.

* * * * *